United States Patent
Lee et al.

(10) Patent No.: US 8,949,727 B2
(45) Date of Patent: Feb. 3, 2015

(54) APPARATUS AND METHOD FOR CONTROLLING LOCK FUNCTION IN PORTABLE TERMINAL

(71) Applicant: Samsung Electronics Co. Ltd., Suwon-si, Gyeonggi-do (KR)

(72) Inventors: Ho-Shin Lee, Suwon-si (KR); Beyong-Ho Yuu, Seongnam-si (KR); Tae-Sung Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 13/715,354

(22) Filed: Dec. 14, 2012

(65) Prior Publication Data

US 2013/0219310 A1 Aug. 22, 2013

(30) Foreign Application Priority Data

Feb. 16, 2012 (KR) .................. 10-2012-0015791

(51) Int. Cl.
G06F 3/048 (2013.01)
G06F 3/0488 (2013.01)
G06F 3/0481 (2013.01)
H04M 1/67 (2006.01)
G06F 21/36 (2013.01)

(52) U.S. Cl.
CPC .............. *G06F 3/048* (2013.01); *G06F 3/0488* (2013.01); *G06F 3/04817* (2013.01); *H04M 1/67* (2013.01); *G06F 21/36* (2013.01)

USPC .......................................................... 715/764

(58) Field of Classification Search
USPC .......................................................... 715/764
See application file for complete search history.

(56) References Cited

U.S. PATENT DOCUMENTS

| | | | | |
|---|---|---|---|---|
| 7,973,778 | B2 * | 7/2011 | Chen .............................. | 345/175 |
| 8,468,460 | B2 * | 6/2013 | Mysliwy et al. .............. | 715/764 |
| 8,780,076 | B2 * | 7/2014 | Ramarao et al. .............. | 345/174 |
| 2007/0150842 | A1 | 6/2007 | Chaudhri et al. | |
| 2013/0019193 | A1 * | 1/2013 | Rhee et al. .................... | 715/769 |

FOREIGN PATENT DOCUMENTS

JP  2007264929 A  10/2007

* cited by examiner

*Primary Examiner* — David Phantana Angkool
(74) *Attorney, Agent, or Firm* — Jefferson IP Law, LLP (57) ABSTRACT

An apparatus and a method for controlling a lock function in a portable terminal are provided. The apparatus includes one or more processors, a display unit for displaying a positional change of an object and an image set including a plurality of objects including the object, and a memory including one or more modules configured to be executed by the one or more processor, including module for displaying the image set, for changing a position of an object of the plurality of objects selected according to a user input, and for controlling the lock function if the selected object is combined with or separated from another object of the plurality of objects according to the positional change. At least one of the selected object and the other object includes a variable area which indicates an extent of the positional change of the selected object or the other object.

26 Claims, 6 Drawing Sheets

APPARATUS AND METHOD FOR CONTROLLING LOCK FUNCTION IN PORTABLE TERMINAL

PRIORITY

This application claims the benefit under 35 U.S.C. §119(a) of a Korean patent application filed on Feb. 16, 2012 in the Korean Intellectual Property Office and assigned Serial No. 10-2012-0015791, the entire disclosure of which is hereby incorporated by reference.

BACKGROUND OF THE INVENTION

1. Field of the Invention

The present invention relates to an apparatus and method for controlling a lock function in a portable terminal. More particularly, the present invention relates to an apparatus and method for releasing or setting a lock function in the portable terminal.

2. Description of the Related Art

Recently, with the rapid development of portable terminals, a portable terminal providing wireless voice calls and data exchanges is becoming widely regarded as a personal necessity of life for many people. Conventional portable terminals have generally been regarded as portable devices providing wireless calls. However, along with technical advances and the introduction of the wireless Internet, portable terminals are now used for many other purposes in addition to simple telephone calls or scheduling. For example, the portable terminal provides a variety of functions to satisfy users' demands, such as, games, remote controlling using near field communication, capturing images using a built-in digital camera, mobile access to the Internet and the WorldWide Web, etc.

In addition, a touch screen technique has recently been applied to a portable terminal, and there is a growing market preference for portable terminals based on a touch screen.

A touch lock function is implemented in general in the portable terminal based on the touch screen to prevent an erroneous touch operation. Accidental "pocket dialing" with the portable terminal can be inconvenient, confusing, and expensive, and should therefore be avoided if possible. In general, the portable terminal releases the touch lock function by detecting an input pattern of a user.

That is, the portable terminal displays a lock release image and secondary image in a touch lock state, and thereafter if the lock release image moves to a path of the secondary image, releases a touch lock.

In addition, the portable terminal displays an image for pattern recognition in the touch lock state, and thereafter if a touch input of a pre-set combination is detected by confirming consecutive touch inputs of the user, releases the touch lock.

The aforementioned touch lock release method detects the touch input of the user in a pre-set screen, and has a problem in that an operation mechanism and a design are monotonous.

Therefore, a need exists for a method for controlling an improved touch lock function in a portable terminal.

SUMMARY OF THE INVENTION

Aspects of the present invention are to address at least the above-mentioned problems and/or disadvantages and to provide at least the advantages described below. Accordingly, an aspect of the present invention is to provide an apparatus and method for improving performance of a lock function in a portable terminal.

Another aspect of the present invention is to provide an apparatus and method for controlling a lock function by changing a shape of an object displayed on a function lock screen in a portable terminal.

Another aspect of the present invention is to provide an apparatus and method for changing a shape of an object by using a variable area of the object displayed on a function lock screen in a portable terminal.

Another aspect of the present invention is to provide an apparatus and method for executing a function lock screen by changing a shape of an object previously displayed in a portable terminal.

In accordance with an aspect of the present invention, an apparatus for controlling a lock function in a portable terminal is provided. The apparatus includes one or more processors, a display unit for displaying a positional change of an object and an image set including a plurality of objects including the object, and a memory including one or more modules configured to be executed by the one or more processors, wherein the one or more modules include a module for displaying the image set, for changing a position of an object of the plurality of objects selected according to a user input, and for controlling the lock function if the selected object is combined with or separated from another object of the plurality of objects according to the positional change, and wherein at least one of the selected object and the other object includes a variable area which indicates an extent of the positional change of the selected object or the other object.

In accordance with another aspect of the present invention, an apparatus for controlling a lock function in a portable terminal is provided. The apparatus includes one or more processors, a display unit for displaying a shape change of an object and an image set including one or more objects, and a memory including one or more modules configured to be executed by the one or more processors, wherein the one or more module include a module for displaying the image set, for changing a shape of an object of the image set selected according to a user input, and for controlling the lock function, and wherein the selected object includes a variable area which indicates an extent of the shape change of the selected object, and wherein the lock function controlled according to one of an extent of the shape change and a size of the variable area.

In accordance with another aspect of the present invention, a method for controlling a lock function in a portable terminal is provided. The method includes displaying an image set including a plurality of objects, changing a position of an object of the plurality of objects selected according to a user input, and controlling the lock function if the selected object is combined with or separated from another object according to the positional change, wherein at least one of the selected object and the other object includes a variable area which indicates an extent of the positional change of the selected object.

In accordance with another aspect of the present invention, a method for controlling a lock function in a portable terminal is provided. The method includes displaying an image set including one or more objects, and changing a shape of an object of the one or more objects selected according to a user input, wherein the selected object includes a variable area which indicates an extent of a positional change of the selected object, and where the lock function is controlled according to one of an extent of the shape change and a size of the variable area.

Other aspects, advantages, salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The exemplary embodiments of the present invention described hereinafter relate to an apparatus and method for controlling a lock function by changing a shape of an object displayed on a function lock screen in a portable terminal.

Further, a usage restriction mode mentioned in the present disclosure is a lock mode for preventing an unnecessary touch input which is not intended by a user from occurring in a touch screen-based portable terminal, and includes a touch lock mode. Furthermore, the portable terminal implies a portable electronic device such as a mobile phone, a media player, a tablet computer, a handheld computer, or a Personal Digital Assistant (PDA). In addition, the portable terminal may be any portable electronic device including a device which combines two or more functions of the aforementioned devices.

Figure 1:
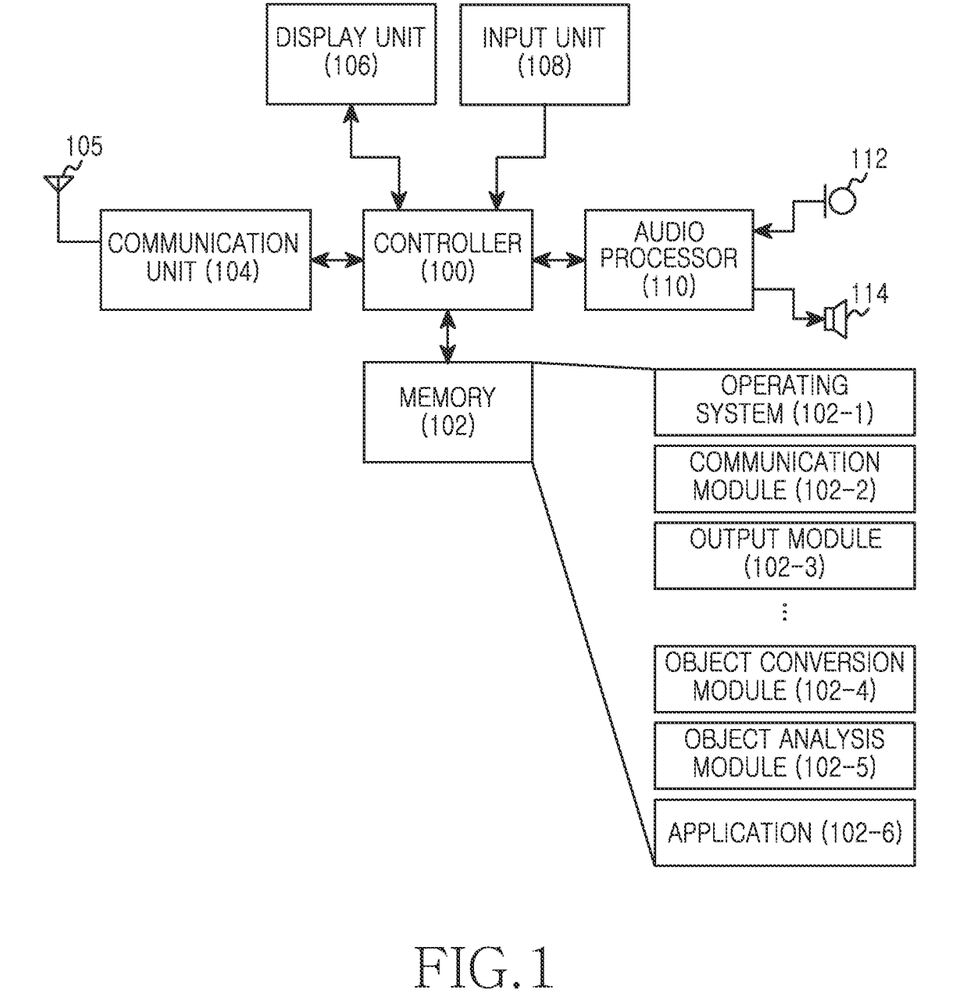
FIG. 1 is a block diagram illustrating a structure of a portable terminal for releasing a usage restriction mode according to an exemplary embodiment of the present invention.

FIG. 1 is a block diagram illustrating a structure of a portable terminal for releasing a usage restriction mode according to an exemplary embodiment of the present invention.

Referring to FIG. 1, a portable terminal includes a controller 100, a memory 102, a communication unit 104, a display unit 106, an input unit 108, and an audio processor 110. The audio processor 110 may receive an input from a microphone 112 and output to a speaker 114. A touch screen combines elements of the display unit 106 and the input unit 108.

The controller 100 of the portable terminal provides overall control of the portable terminal. For example, the controller 100 processes and controls voice telephony and data communication. In addition to its typical function, according to an exemplary embodiment of the present invention the controller 100 also displays a function lock screen to report a usage restriction mode when entering the usage restriction mode. In this case, upon detection of a user input in a state where the function lock screen is displayed, the controller 100 provides control such that a shape of an object included in the function lock screen is changed according to the user input.

Further, even in a state where the usage restriction mode is released, the controller 100 can provide control to display an object for allowing the portable terminal to enter the usage restriction mode. Accordingly, the controller 100 changes the shape of the previously displayed object according to the user input.

Thereafter, the controller 100 can provide control to release the usage restriction mode or to enter the usage restriction mode by using the changed object shape.

Operations of the controller 100 can be performed by a specific software module or an instruction set stored in the memory 102. In this case, the software module can be executed by the controller 100. In addition, the operations of the controller 100 can be performed by using one or more processors, and the controller 100 can be defined as a processor.

The memory 102 may include a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic tape cassette. Alternatively, the memory 102 may be configured in combination of all or some of these storage media. In addition, the memory 102 may consist of a plurality of memory components.

Further, the memory 102 may include an attachable storage device capable of accessing the electronic device through a communication network such as the Internet, an intranet, a Local Area Network (LAN), a Wide LAN (WLAN), a Storage Area Network (SAN), or a communication network configured by combining the networks. The storage device can access the electronic device through an external port.

The memory 102 stores a software module. Constitutional elements of the software module include an operating system software module 102-1, a communication software module 102-2, a display software module 102-3, and one or more application software modules 102-6. Herein, the software module stored in the memory is simply expressed as a module. Further, since the software module can be expressed as a set of instructions, the module is also expressed as an instruction set or a program.

The operating system software module 102-1 includes various software constitutional elements for controlling a general system operation. The control of the general system operation implies, for example, memory management and control, storage hardware (device) control and management, power control and management, etc. Such an operating system software element also performs a function of facilitating communication between various hardware (device) and software constitutional elements. The operating system software element 102-1 may be an embedded operating system such as WINDOWS, LINUX, Darwin, RTXC, UNIX, OS X, Android, Symbian, Maemo, VxWorks, etc.

The communication software module 102-2 includes various software constitutional elements for handing data transmission and data reception, and enables communication with other electronic devices (e.g., a computer, a server, and/or a portable terminal) through wireless communication or an external port. Although not shown in FIG. 1, the external port may be used to directly connect with another portable terminal or to indirectly connect with another portable terminal through a network (e.g., the Internet, an intranet, a wireless LAN, etc.). The external port is not limited thereto. For example, the external port may be a Universal Serial Bus (USB) port or a FIREWIRE port.

The display software module 102-3 includes various software constitutional elements for providing and displaying graphics on a touch screen. The term 'graphics' is used as the general concept including text, a web page, an icon, a digital image, a video, an animation, etc.

The application software 102-6 may include a browser, an email application, an instant messenger, word processing, a keyboard emulation, an address book, a touch list, a widget, a JAVA enabled application, coding, Digital Rights Management (DRM), voice recognition, voice recording, a position determining function, a location based service, a music player, etc. Further, the application software 102-6 can be provided when the portable terminal is manufactured or can be added by a user.

The memory 102 may further include an object conversion module 102-4 and an object analysis module 102-5 according to an exemplary embodiment of the present invention.

Herein, the object conversion module 102-4 changes a shape of a previously displayed object according to a user input.

In this case, the object conversion module 102-4 also changes a variable area which is an area for indicating an extent of the change in the object shape, while changing the object shape. Herein, the object shape changed by the object conversion module 102-4 may be in association with a separation of a plurality of combined objects or a combination of a plurality of separate objects.

In addition, the object analysis module 102-5 determines whether to enter or release a usage restriction mode by using the object shape changed according to the user input.

For example, the object analysis module 102-5 can release the usage restriction mode when it determines that the object is changed to an extent greater than or equal to a pre-set threshold (i.e., a reference value capable of determining the release of the usage restriction mode). Herein, the reference value may be a value for determining a combination of objects, a value for determining the separation of objects, etc.

The communication unit 104 processes a signal transmitted and received through an antenna 105. For example, the communication unit 104 may include an antenna module, a Radio Frequency (RF) processor, an amplifier, a tuner, an oscillator, a digital signal process, a coder-decoder (codec), etc. However, the communication unit 104 is not limited thereto, and thus may include circuits for performing the functions of all of the aforementioned modules.

The display unit 106 may include a touch screen, and thus provides an output interface and an input interface between the portable terminal and the user. For example, the display unit 106 displays state information of the portable terminal, text input by the user, a moving picture, a still picture, etc., under the control of the controller 100. For another example, the display unit 106 recognizes user touch information regarding a touch sensing surface and provides the information to the controller 100.

In addition, the display unit 106 displays an image set including a plurality of objects, an object shape changed according to the user input, a variable area depending on the change of the object shape, etc., according to the exemplary embodiments of the present invention.

The input unit 108 provides input data generated by a user selection to the controller 100. For one example, when the display unit 106 consists of a touch screen, the input unit 108 includes only a control button for controlling the portable terminal. For another example, the input unit 108 may include a keypad for receiving input data from the user. In addition, the input unit 108 according to exemplary embodiments of the present invention provides user input data for changing the object shape to the controller 100.

The audio processor 110 controls an input and output of an audio signal. For example, the audio processor 110 transmits an audio signal provided from the controller 100 to speaker 114, and provides an audio signal provided from a microphone 112 to the controller 100.

Figure 2:
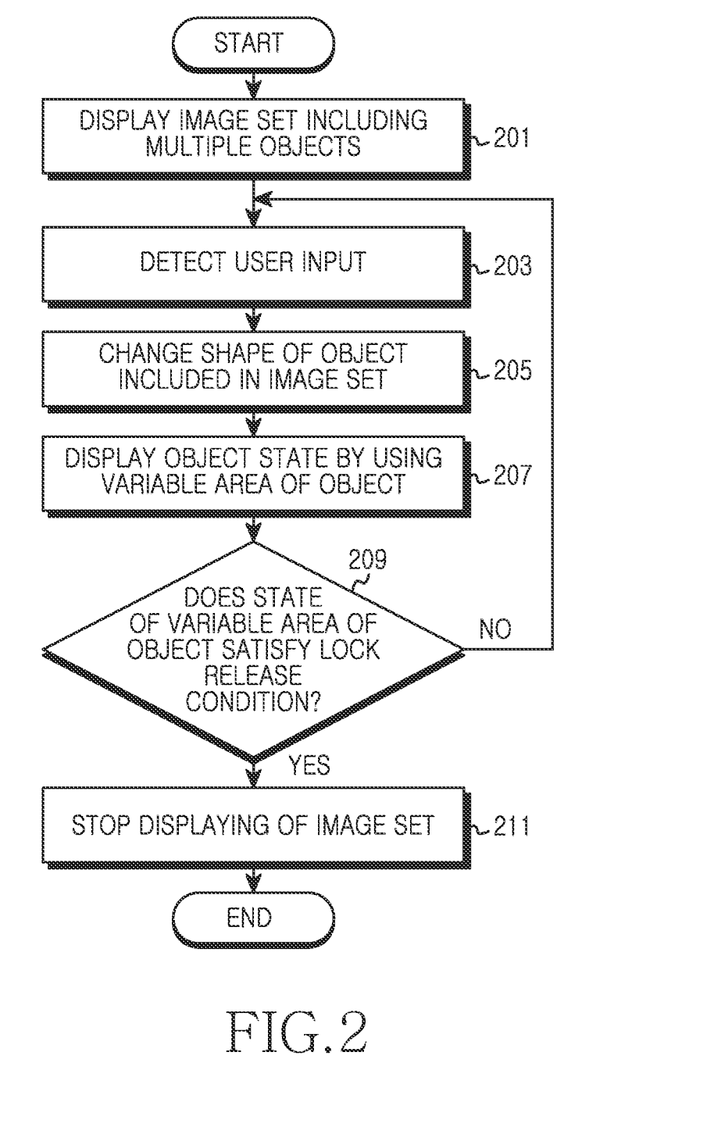
FIG. 2 is a flowchart illustrating a process for releasing a usage restriction mode in a portable terminal according to an exemplary embodiment of the present invention.

FIG. 2 is a flowchart illustrating a process for releasing a usage restriction mode in a portable terminal according to an exemplary embodiment of the present invention.

Referring to FIG. 2, the usage restriction mode is a function for restricting a functional operation of the portable terminal. For example, the usage restriction mode may be a touch lock mode for preventing a function not intended by a user from being executed in a portable terminal employing a touch screen, such as an accidental touch input.

In step 201, in a state where the portable terminal enters the usage restriction mode, the portable terminal displays a function lock screen to inform the usage restriction mode.

In this case, the function lock screen implies a screen on which an image set including a plurality of objects is displayed. In a state where the function lock screen is displayed, even if a user input (e.g., a touch input) is detected, the portable terminal does not perform an operation corresponding to the detected input, and changes only a shape of an object included in the function lock screen. In addition, the portable terminal can release the usage restriction mode by recognizing a change in the shape of the object included in the function lock screen according to an exemplary embodiment of the present invention. The object included in the image set may be an image, text, etc. At least one object may include a variable area for indicating an extent of the change in the object shape (i.e., a position or an exterior).

In step 203, the portable terminal determines whether the user input is detected. In step 205, the portable terminal changes the shape of the object included in the function lock screen (i.e., the image set) according to the detected user input. For example, the function lock screen may consist of a first object and a second object, and the objects may move according to the user input, and thus positions of the first object and the second object may be changed. In addition, the exterior of the object may be changed according to the user input.

In this case, if the user input is persistently generated, there is a great change in the object shape. That is, the extent of the change may vary according to how long the user maintains the input.

In step 207, the portable terminal displays a state of the object by using a variable area of the object. Herein, as described above, the variable area is an area which indicates an extent of the change in the object shape depending on the user input. For example, the variable area may be increased or decreased according to the movement of the object.

In step 209, the portable terminal determines whether a variable area state of the object satisfies a condition for releasing the usage restriction mode.

If it is determined in step 209 that the variable area state of the object does not satisfy the condition of releasing the usage restriction mode, the operation of step 203 is performed again.

Otherwise, if it is determined in step 209 that the variable area state of the object satisfies the condition of releasing the usage restriction mode, proceeding to step 211, the portable terminal releases the usage restriction mode. For example, the portable terminal can release the usage restriction mode by stopping the displaying of the function lock screen (i.e., the image set) and by displaying a screen including an item for a functional operation.

When the usage restriction mode is released in accordance with the change in the object shape as described above, the procedure of FIG. 2 ends.

The object shape for releasing the usage restriction mode mentioned with reference to FIG. 2 can be defined as follows.

As a first exemplary embodiment of the present invention, the function lock screen can be configured with a shape in which a plurality of objects are combined with each other, and at least any one object among the combined objects can be separated according to a user input. In this case, the object separated by the user input may be a shape of the object for releasing the usage restriction mode, and the object can display a situation of separating the object by using a variable area.

As a second exemplary embodiment of the present invention, the function lock screen may be configured with a shape in which a plurality of objects are displayed independent from each other, and at least any one of objects among separated objects can be combined with another object according to the user input. In this case, the object combined by the user input may be a shape of the object for releasing the usage restriction mode, and the object can display a situation of combining the object by using a variable area.

As a third exemplary embodiment of the present invention, the function lock screen may be configured with one or more objects, and an exterior of the object can be changed according to the user input. In this case, the exterior of the object changed by the user input may be a shape of the object for releasing the usage restriction mode, and the object can display the exterior changed by using a variable area.

Although the method for releasing the usage restriction mode by changing the object shape of the function lock screen is described in FIG. 2, it is also possible to enter the usage restriction mode in the present invention by changing the object shape of the function lock screen.

For example, the portable terminal may display a first object and a second object on a screen on which an application is executed or a certain area of the screen on which items of the application is displayed, and thereafter may move the first object or the second object. If it is determined that the two objects are combined, the portable terminal may enter the usage restriction mode.

Figure 3A:
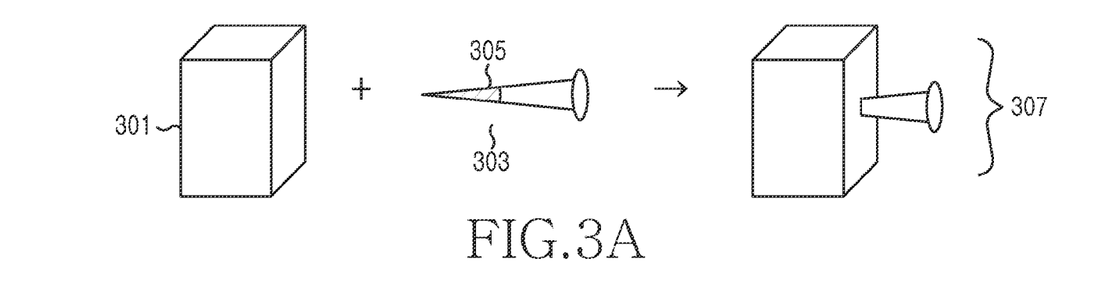
FIGS. 3A and 3B illustrate a process for releasing a usage restriction mode in a portable terminal according to an exemplary embodiment of the present invention.
Figure 3B:
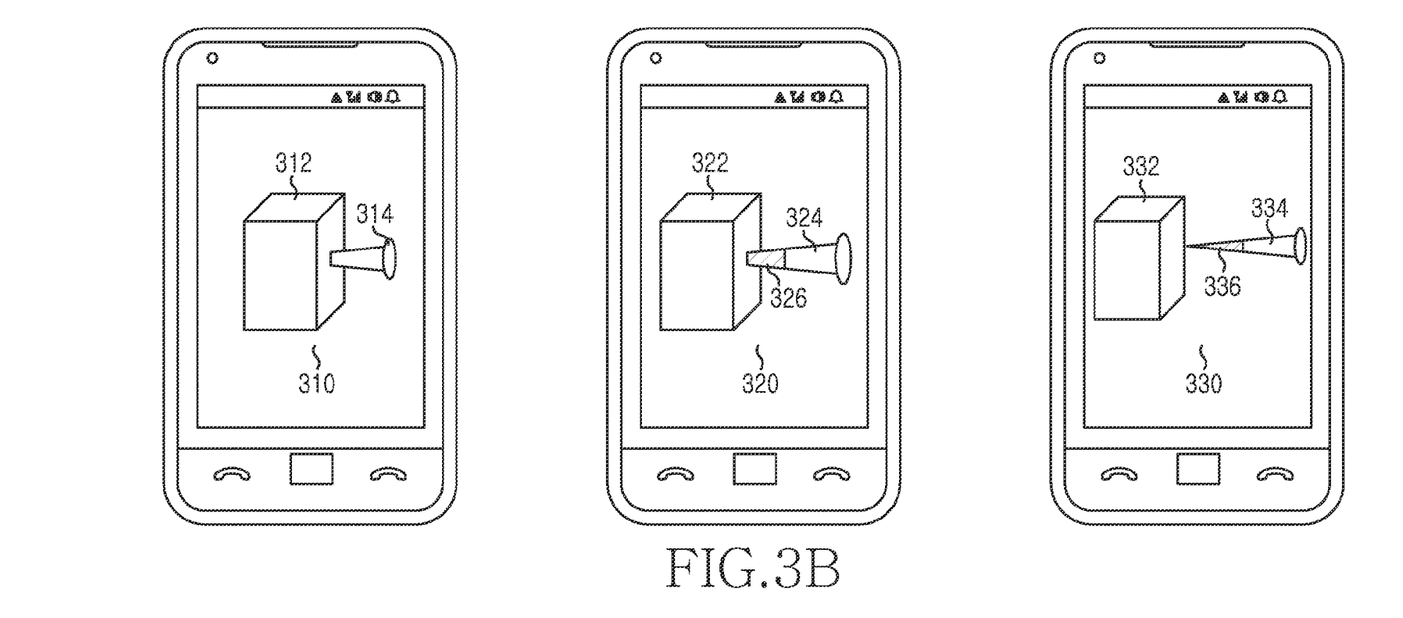

FIGS. 3A-3B illustrate a process for releasing a usage restriction mode in a portable terminal according to an exemplary embodiment of the present invention.

In FIGS. 3A-3B, the portable terminal can release the usage restriction mode by using a function lock screen which is an image set consisting of a plurality of objects as described above.

Referring to FIG. 3A, the function lock screen may consist of an image set 307 in which a first object (e.g., a wood block) 301 and a second object (e.g., a nail) 303 are combined. In this example, the wood block and the nail have an intuitively obvious relationship to each other; however, the present invention is not limited thereto.

In this case, the object included in the function lock screen may include a variable area to display an object shape which changes according to a user input. For example, a variable area of the second object 303 can be identified by a reference numeral 305. By using the variable area 305, a shape of the second object 303 separated from the first object 301 can be expressed.

That is, the portable terminal can change the shape of the first object or the second object according to the detected user input, and if the object shape is changed to a pre-set shape, can release the usage restriction mode. This is depicted by FIG. 3B.

For example, the portable terminal detects the user input in a state of displaying a function lock screen 310 in which a first object 312 and a second object 314 are combined. If the detected user input is for moving the second object 314 to the right, the second object 314 moves to an extent of the detected user input and is then separated from the first object 312. Herein, the change in the object shape implies separating of the first object 312 and the second object 314.

Accordingly, the portable terminal can display a separation state by displaying a variable area to an extent of separating the second object 314.

If a second object 324 is separated from a first object 322 in function lock screen 320 to an extent less than a pre-set threshold according to the user input, for example, if a variable area 326 is exposed less than the threshold amount, that is, in the case of maintaining a state where a first object 322 and the second object 324 remain combined, the portable terminal remains in the usage restriction mode.

Otherwise, if a second object 334 is separated from a first object 332 to an extent greater than or equal to a pre-set threshold according to the user input, for example, if a variable area 336 is exposed at least the threshold amount, that is, in a case where a first object 332 and the second object 334 are separated in function lock screen 330, the portable terminal can release the usage restriction mode. Herein, the pre-set threshold is a reference value that can determine whether to release the usage restriction mode, and is a value for determining a situation in which the first object 332 and the second object 334 are separated.

Figure 4A:
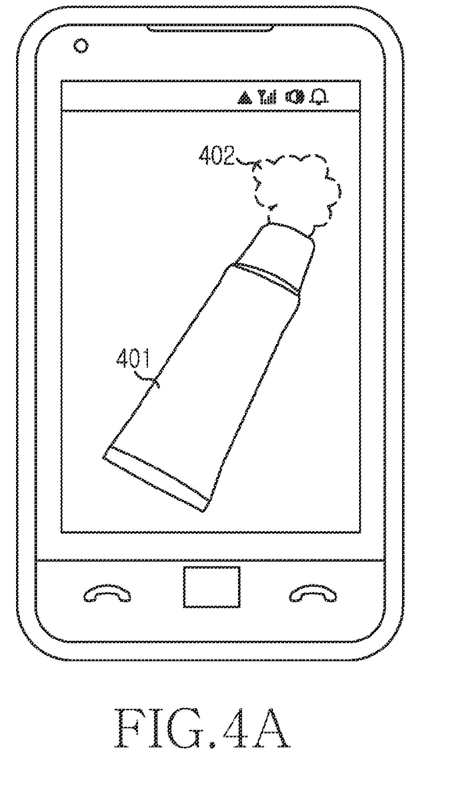
FIGS. 4A-4C illustrate a process for releasing a usage restriction mode in a portable terminal according to an exemplary embodiment of the present invention.
Figure 4B:
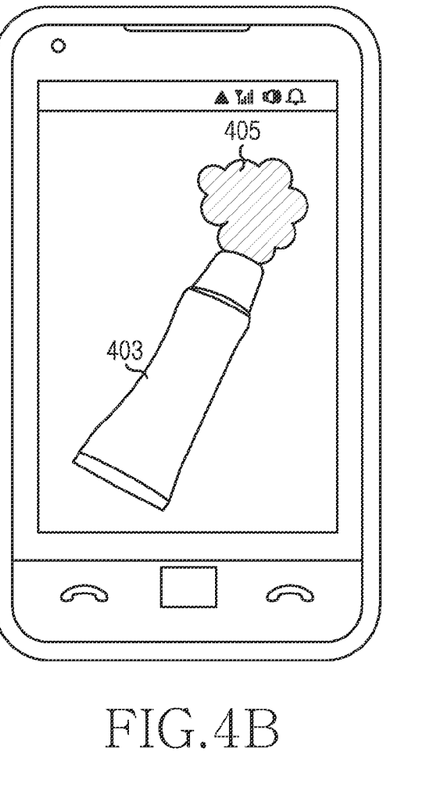
Figure 4C:
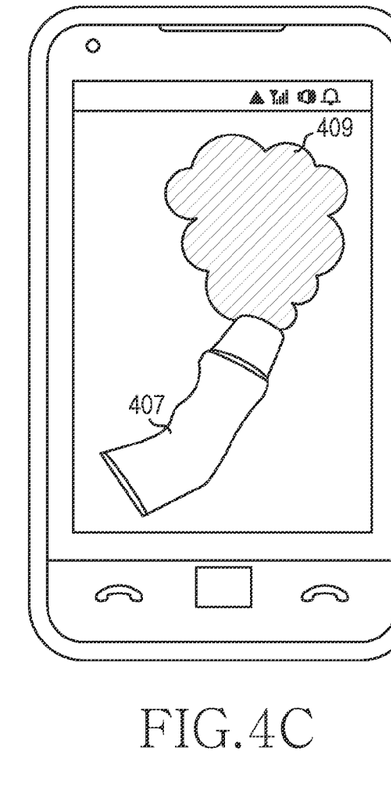

FIGS. 4A-4C illustrate a process for releasing a usage restriction mode in a portable terminal according to an exemplary embodiment of the present invention.

In FIGS. 4A-4C, the portable terminal can release the usage restriction mode by using a function lock screen including one or more objects.

Referring to FIG. 4A, the function lock screen consists of a first object 401 including a variable area. In this case, the first object 401 can indicate an object change state depending on a user input by using the variable area. For example, the variable area of the first object 401 may be distorted or folded.

Upon detecting a user input in a state where the first object 401 is displayed, the portable terminal determines whether the user input is detected on the first object 401. Thereafter, if the user input is detected on the first object 401, the portable terminal changes a shape of the first object 401 according to the user input.

For example, referring to FIG. 4B, the portable terminal detects the user input in a state of displaying the function lock screen including a first object 403. Upon detecting the user input on the displayed first object 403, the portable terminal can change a shape of an area in which the user input is detected in the area of the previously output first object 403, and according to the changed shape, can apply an effect of showing a property 405 of the first object. Herein, the change in the shape of the first object 403 is the change in an exterior of a previously displayed water color image, and the applying of the effect of showing the property 405 is an effect in which a water color flows out while the exterior of a water color object is changed. In this case, a variable area of the first object 401 may be a full area 401 of the first object or an area 403 to which the property is applied. In this example, the water color object and the water color flow have an intuitively obvious relationship to each other; however, the present invention is not limited thereto.

If the shape of the first object 403 is changed to an extent less than a pre-set threshold according to the user input, the portable terminal remains in the usage restriction mode. This is depicted by FIG. 4B.

Otherwise, if the shape of a first object 407 is changed to an extent greater than or equal to the pre-set threshold according to the user input, the portable terminal can release the usage restriction mode. In this case, the effect of showing the property 409 will be greater as the first object 407 is changed more than the threshold amount. This is depicted by FIG. 4C.

Although the usage restriction mode is released in FIG. 4C by using the change in the variable area of the first object 407, the present invention can release the usage restriction mode by using the effect of showing the property 409 of the first object 407. For example, the usage restriction mode can be released according to the extent of the flowing of the water color while the exterior of the first object 407, i.e., the water color, is changed.

Figure 5A:
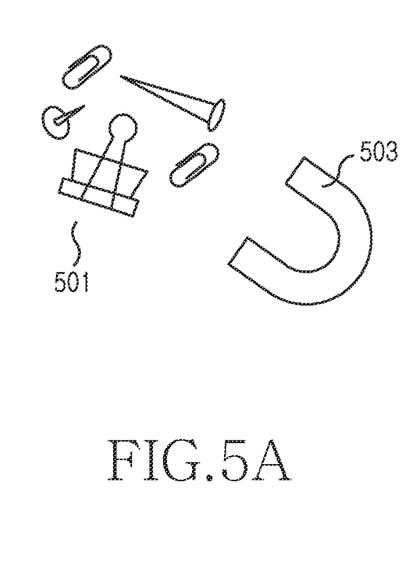
FIGS. 5A-5C illustrate a process for releasing a usage restriction mode in a portable terminal according to an exemplary embodiment of the present invention.
Figure 5B:
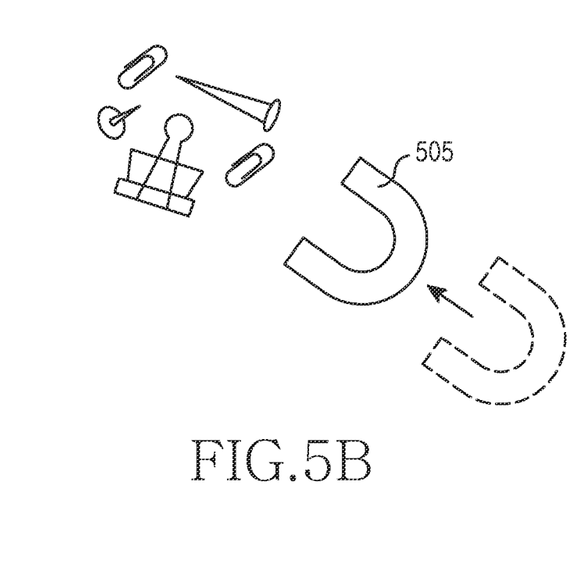
Figure 5C:
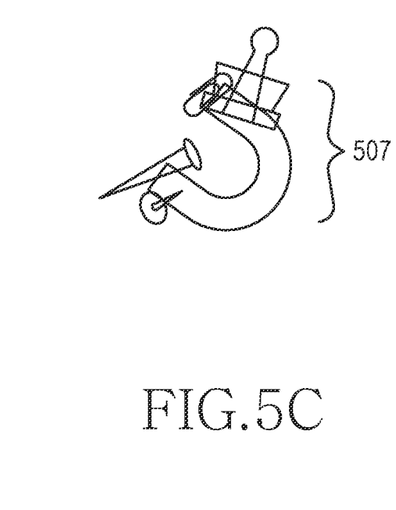

FIGS. 5A-5C illustrate a process for releasing a usage restriction mode in a portable terminal according to an exemplary embodiment of the present invention.

In FIGS. 5A-5C, the portable terminal can release the usage restriction mode by using a function lock screen which includes an image set consisting of a plurality of objects as described above.

Referring to FIG. 5A, the function lock screen may consist of a first object (e.g., a material which is responsive to magnetism) 501 and a second object (e.g., a magnet) 503 which are independent from each other. In this example, the material responsive to magnetism and the magnet have an intuitively obvious relationship to each other; however, the present invention is not limited thereto.

In this case, the object included in the function lock screen may include a variable area to display an object shape which is changed according to a user input. For example, if the second object 503 moves to a position of the first object 501, as in the second object 505 as shown in FIG. 5B, the first object 501 is combined with the second object 505 to form combination 507 as shown in FIG. 5C, and the portable terminal releases a usage restriction mode at a time at which the first object 501 and the second object 505 are combined to form combination 507. In this case, a variable area of the second object 503 may be an area in which the first object 501 is combined.

FIGS. 6A-6D illustrate a process for entering a usage restriction mode in a portable terminal according to an exemplary embodiment of the present invention.

Figure 6A:
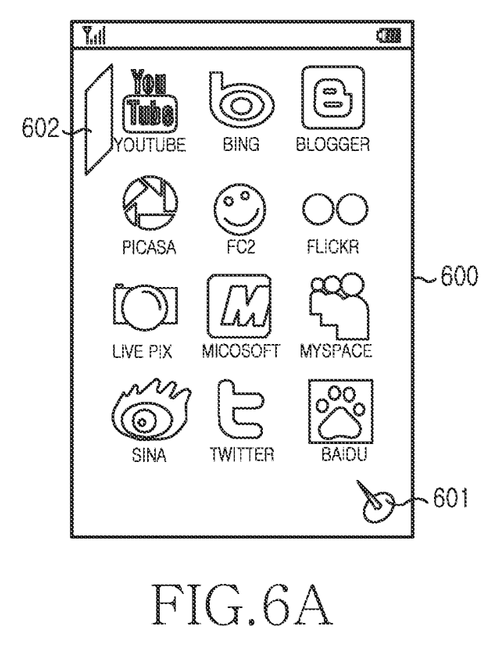
FIGS. 6A-6D illustrate a process for entering a usage restriction mode in a portable terminal according to an exemplary embodiment of the present invention.

Referring to FIG. 6A, the portable terminal can display a screen 600 showing items of a pre-installed application in a state where the usage restriction mode is released.

In this case, the portable terminal can also display image sets 601 and 602, which are used to enter the usage restriction mode.

Accordingly, a user of the portable terminal can execute a plurality of applications by using the items of the previously displayed screen 600.

If the user intends to enter the usage restriction mode while executing the application, the user can change the image set used to enter the usage restriction mode.

Figure 6B:
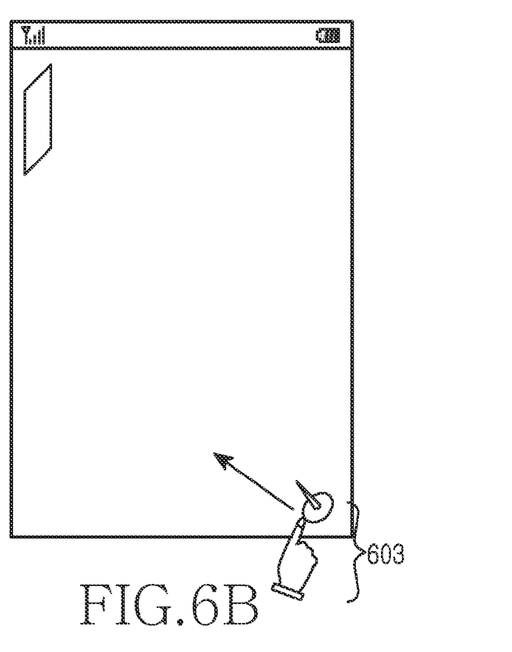

For example, the portable terminal can display the first object 601 and the second object 602 on predetermined areas of the displayed screen as shown in FIG. 6B, and thereafter can move the first object 601 or the second object 602 by detecting a user input 603.

In this case, the user of the portable terminal can move the first object 601 or the second object 602 in a state where a touch input is maintained until a state 604 wherein the two objects overlap with each other.

In addition, the portable terminal can move the object by flicking the first object 601 or the second object 602. The object moved in this case may be refracted due to a screen edge and thus may overlap with another object.

Figure 6C:
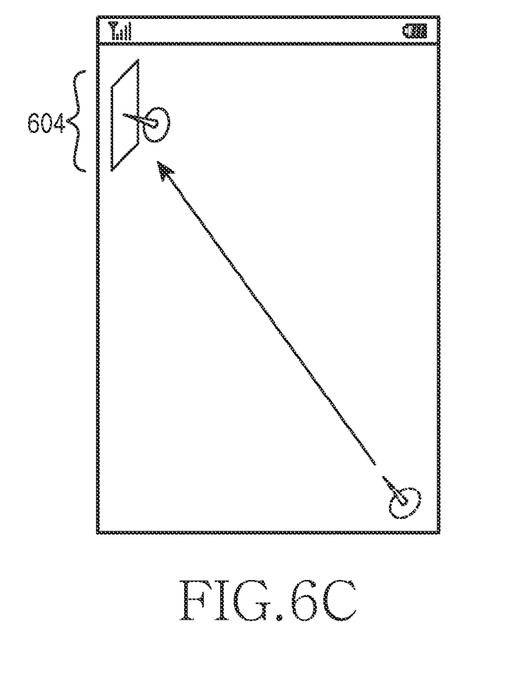

Thereafter, if the object is changed to a pre-set shape 604 in which the first object 601 and the second object 602 overlap with each other as shown in FIG. 6C, the portable terminal may enter the usage restriction mode.

Figure 6D:
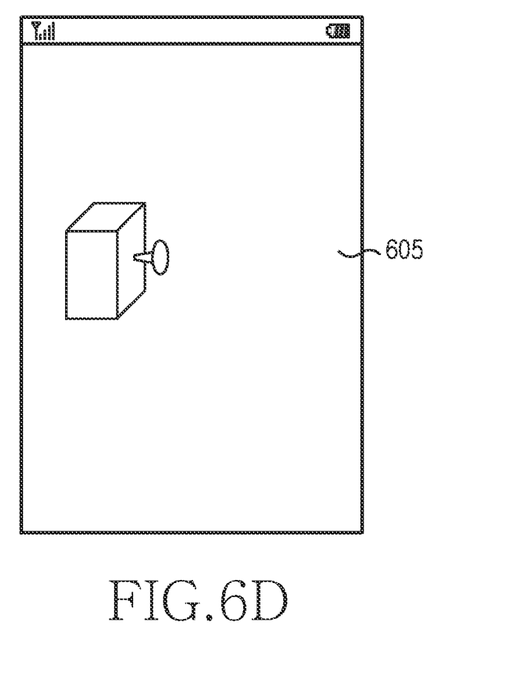

In this case, the portable terminal which enters the usage restriction mode displays the function lock screen 605 as shown in FIG. 6D and determines whether a user input for releasing the usage restriction mode is detected.

Methods based on the exemplary embodiments disclosed in the claims and specification of the present invention can be implemented in hardware, in software encoded on a computer-readable recording medium, or a combination of both.

When implemented in software, the computer readable recording medium for storing one or more programs (i.e., software modules) is be provided. The one or more programs stored in the computer readable recording medium are configured for execution performed by one or more processors in an electronic device such as a portable terminal. The one or more programs include instructions for allowing the electronic device to execute the methods based on the exemplary embodiments disclosed in the claims and specification of the present invention.

A program for causing a processor to execute the exemplary embodiments of the present invention (i.e., the software module or software) can be stored in a memory that is a non-transitory computer readable storage medium. Examples of the memory include a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic tape cassette, or any other nonvolatile computer readable storage medium. Alternatively, the program can be stored in a memory configured in combination of all or some of these storage media. In addition, the configured memory may be plural in number.

Further, the program can be stored in an attachable non-volatile storage device capable of accessing the electronic device through a communication network such as the Internet, an Intranet, a Local Area Network (LAN), a Wide LAN (WLAN), a Storage Area Network (SAN), or a communication network configured by combining the networks. The storage device can access the electronic device through an external port.

Furthermore, an additional storage device on the communication network can access a portable electronic device.

The exemplary embodiments of the present invention are provided to control a lock function by changing a shape of an object displayed on a function lock screen in a portable terminal. Accordingly, it is possible to provide a lock function control method capable of providing higher user satisfaction than the portable terminal of the related art which uses a touch movement or an input pattern.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling a lock function in a portable terminal, the apparatus comprising:
   one or more processors;
   a display unit for displaying a positional change of an object and an image set comprising a plurality of objects including the object; and
   a memory including one or more modules configured to be executed by the one or more processors,
   wherein the one or more modules include a module for displaying the image set, for changing a position of an object of the plurality of objects selected according to a user input, and for controlling the lock function if the selected object is combined with or separated from another object of the plurality of objects according to the positional change, and
   wherein at least one of the selected object and the other object includes a variable area which indicates an extent of the positional change of the selected object or the other object.

2. The apparatus of claim 1, wherein the one or more modules further include a module for changing the variable area according to the positional change of the selected object.

3. The apparatus of claim 1, wherein the one or more modules further include a module for, when the variable area is changed to an extent greater than or equal to a predetermined threshold, determining that the objects are correspondingly combined or separated according to the positional change.

4. The apparatus of claim 3, wherein, if an amount of the variable area greater than the threshold is visible, then the selected object and the other object are determined to be separated from each other.

5. The apparatus of claim 3, wherein, if an amount of the variable area less than the threshold is visible, then the selected object and the other object are determined to be combined with each other.

6. The apparatus of claim 1, wherein an extent of the positional change is determined in accordance with a duration of the user input.

7. The apparatus of claim 1, wherein the one or more modules further include a module for displaying the image set in any one of a state of setting usage restriction, a state of executing an application, and a state of displaying an application item.

8. An apparatus for controlling a lock function in a portable terminal, the apparatus comprising:
   one or more processors;
   a display unit for displaying a shape change of an object and an image set comprising one or more objects; and
   a memory including one or more modules configured to be executed by the one or more processors,
   wherein the one or more module include a module for displaying the image set, for changing a shape of an object of the image set selected according to a user input, and for controlling the lock function, and
   wherein the selected object includes a variable area which indicates an extent of the shape change of the selected object, and
   wherein the lock function controlled according to one of an extent of the shape change and a size of the variable area.

9. The apparatus of claim 8, wherein the one or more modules further include a module for changing the variable area according to the shape change of the selected object.

10. The apparatus of claim 8, wherein the one or more modules further include a module for controlling the lock function by confirming whether the variable area is changed to an extent greater than or equal to a predetermined threshold.

11. The apparatus of claim 8, wherein the one or more modules further include a module for controlling the lock function by confirming whether the shape of the selected object is changed to an extent greater than or equal to a predetermined threshold.

12. The apparatus of claim 8, wherein an extent of the shape change is determined in accordance with a duration of the user input.

13. The apparatus of claim 8, wherein the one or more modules further include a module for displaying an image set in any one of a state of setting usage restriction, a state of executing an application, and a state of displaying an application item.

14. A method for controlling a lock function in a portable terminal, the method comprising:
   displaying an image set comprising a plurality of objects;
   changing a position of an object of the plurality of objects selected according to a user input; and
   controlling the lock function if the selected object is combined with or separated from another object of the plurality of objects according to the positional change,
   wherein at least one of the selected object and the other object includes a variable area which indicates an extent of the positional change of the selected object.

15. The method of claim 14, wherein the changing of the position of the selected object comprises changing the variable area according to the positional change of the selected object.

16. The method of claim 14, wherein when the selected object is combined with or separated from the other object according to the positional change, the variable area is correspondingly changed to an extent greater than or equal to a predetermined threshold.

17. The method of claim 14, wherein, if an amount of the variable area greater than the threshold is visible, then the selected object and the other object are determined to be separated from each other.

18. The method of claim 14, wherein, if an amount of the variable area less than the threshold is visible, then the selected object and the other object are determined to be combined with each other.

19. The method of claim 14, wherein an extent of the positional change is determined in accordance with a duration of the user input.

20. The method of claim 14, wherein the image set is displayed in any one of a state of setting a usage restriction, a state of executing an application, and a state of displaying an application item.

21. A method for controlling a lock function in a portable terminal, the method comprising:

displaying an image set comprising one or more objects; and changing a shape of an object of the one or more objects selected according to a user input, wherein the selected object includes a variable area which indicates an extent of a positional change of the selected object, and wherein the lock function is controlled according to one of an extent of the shape change and a size of the variable area.

22. The method of claim 21, wherein the changing of the shape of the selected object comprises changing the variable area according to the corresponding shape change of the selected object.

23. The method of claim 21, wherein the controlling of the lock function according to the extent of the shape change comprises confirming whether the shape of the selected object is changed to an extent greater than or equal to a predetermined threshold.

24. The method of claim 21, wherein the controlling of the lock function according to the size of the variable area comprises confirming whether the variable area is changed to an extent greater than or equal to a predetermined threshold.

25. The method of claim 21, wherein an extent of the shape change is determined in accordance with a duration of the user input.

26. The method of claim 21, wherein an image set is displayed in any one of a state of setting a usage restriction, a state of executing an application, and a state of displaying an application item.

* * * * *